United States Patent [19]

Knothe et al.

[11] 4,153,124
[45] May 8, 1979

[54] ELECTROMAGNETICALLY COMPENSATING BEAM BALANCE

[75] Inventors: Erich Knothe, Bovenden; Christoph Berg, Göttingen; Franz J. Melcher, Ellierode, all of Fed. Rep. of Germany

[73] Assignee: Sartorius-Werke GmbH (und vorm. Göttinger Präzisionswaagenfabrik GmbH), Göttingen, Fed. Rep. of Germany

[21] Appl. No.: 795,636

[22] Filed: May 10, 1977

[30] Foreign Application Priority Data

May 14, 1976 [DE] Fed. Rep. of Germany ....... 2621483

[51] Int. Cl.$^2$ .................. G01G 7/02; G01G 21/24
[52] U.S. Cl. .................. 177/210 EM; 177/229; 177/248; 177/DIG. 9
[58] Field of Search ......... 177/184, DIG. 9, 210 EM, 177/255, 229, 246, 252, 248

[56] References Cited

U.S. PATENT DOCUMENTS

| 3,026,954 | 3/1962 | Appius | 177/229 X |
| 3,078,936 | 2/1963 | Thomson | 177/210 EM |
| 3,347,328 | 10/1967 | Schieser | 177/229 |
| 3,734,218 | 5/1973 | Kupper | 177/DIG. 9 |
| 4,062,416 | 12/1977 | Berg | 177/210 EM |

Primary Examiner—Joseph W. Hartary
Attorney, Agent, or Firm—Browdy and Neimark

[57] ABSTRACT

An electromagnetically compensating beam balance has a balance housing, a beam and a fixed counterweight. Weight changing means, which change the weighing range (scale) by substitution, are provided on the load receiving side. A parallel guidance system is provided. Rods which accept only horizontal forces are coupled between a load carrier and the housing. Vertical flexure elements, which accept vertical forces, are coupled between the beam and the load carrier.

14 Claims, 8 Drawing Figures

ELECTROMAGNETICALLY COMPENSATING BEAM BALANCE

BACKGROUND OF THE INVENTION

A plurality of balances with different types of bearings for their individual elements, e.g. the beam and load carrier, are already known. Thus, in balances with below-balance weighing, bearings are used in the form of knife-edge bearings (German Pat. No. 1,279,946), crossed-band bearings (German Pat. No. 843,606), horizontal taut bands and vertical springs (*VDI Zeitschrift*, 83/45, 1931, p. 1189). When these types of bearings are used, the pan hangs free and can swing, leading to variations in the measured value. In addition, arrestment and release are required for knife-edge bearings, requiring additional structural material and higher cost. Moreover, knife-edge bearings are subject to wear. Horizontal taut bands require greater pretensioning, resulting in high material stress and preventing placement of considerable loads on the balance.

In top-loading balances the pan is guided by a parallel guidance system in the form of a parallelogram. Once again, knife-edge bearings (German Pat. No. 1,282,307), cross band bearings (Swiss Pat. No. 486,011) and crossed-band bearings (German Pat. No. 2,338,272) are known bearings. The disadvantages of these bearings are the same as those described above, with the crossed-band bearing having a large number of spring elements and therefore a large spring constant, so that hysteresis occurs easily.

Electromagnetic force compensation in beam balances is also a part of the state of the art. The coil can be mounted in the vicinity of the beam pivot, producing a torque to achieve compensation. The coil can also be mounted in the vicinity of the counterweight, producing a force for compensation.

If it is desired to use the bearings described hereinabove and known from the state of the art, in a balance provided with a fixed counterweight on its beam and with a weight changing system on its hook side to expand the weighing range by substitution, one must either take into account the disadvantages of the freely suspended pan or install a parallel guidance system with a number of bearing points subject to a complex stress pattern.

SUMMARY OF THE INVENTION

It is the principal object of the present invention to provide a beam balance of the type mentioned above in which the load carrier cannot swing freely.

It is another object to provide a beam balance of the type mentioned above which has a simple parallel guidance system and can be easily dimensioned and manufactured.

The foregoing objects, as well as others which are to become clear from the text below, are achieved in an electromagnetically compensating beam balance which has a balance housing, a beam, fixed counterweight means on the beam and a weight changing means. The salient features of the improved balance include at least two rods which are connected to the load carrier and form a parallel guidance system therewith. The rods couple the load carrier to the housing and accept primarily only horizontal forces. Vertical flexure elements are provided which couple the load carrier to the beam and accept primarily only vertical forces.

A balance according to the present invention has the advantage that the separation of the horizontal and vertical force components in the suspension results in a simple and easily dimensioned parallel guidance system with consequent good weighing characteristics. The vertical spring elements are subjected only to tensile stress, so that these spring elements can be made relatively thin. The arrangement of the present invention is so constructed that virtually no lateral forces are transmitted to the beam. Moreover, very few springs are required, with the stress on each spring being defined exactly. In one detailed variant of the present invention, a constant load acts on the vertical spring elements, so that no linearity errors resulting from bending of the beam or elongation of the springs can occur, and good reproducibility of weighing is ensured. In another possible variant, swinging movements of the pan are rapidly damped by friction joints between the pan and the load carrier.

BRIEF DESCRIPTION OF THE DRAWINGS

The invention is described in greater detail below with reference to the attached drawings.

DETAILED DESCRIPTION OF THE PREFERRED EMBODIMENTS

Figure 1:
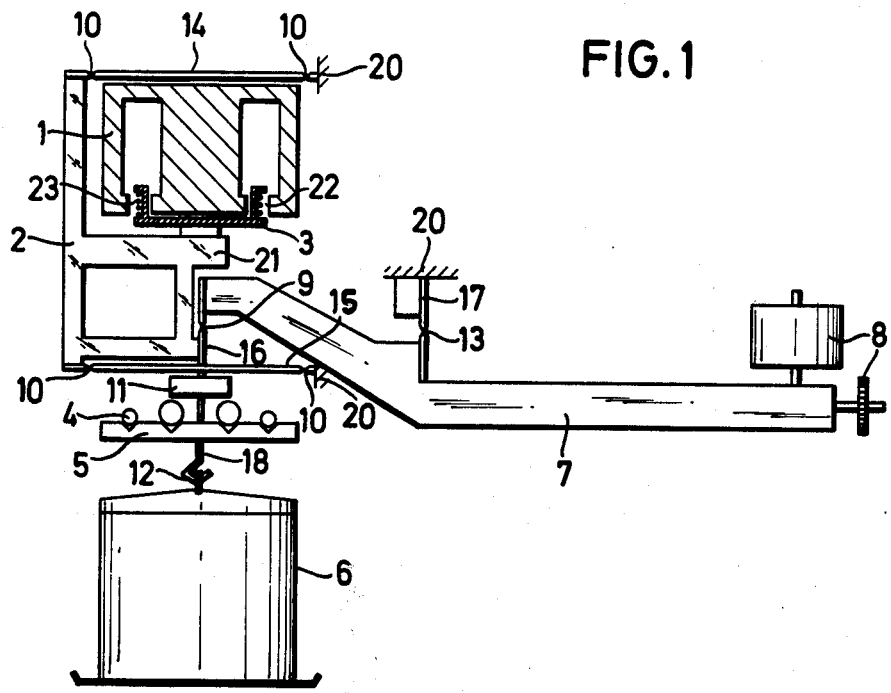
FIG. 1 is a somewhat diagrammatic illustration of a first embodiment of a balance according to the present invention in a side, partially sectional view.

The balance shown in FIG. 1 has a beam 7, suspended in a balance housing 20 by a spring (flexure) element 17 with an articulation 13 as a pivot. The beam 7 supports a counterweight 8 near one of its ends, the height of the counterweight being adjustable and set so that the beam 7 is indifferent. In other words, tilting the balance housing 20 does not change the reading of the balance. At its other end, the beam 7 is connected to an articulation 9 with an associated load carrier 2 by a vertically extending spring (flexure) element 16. A respective taut band can be substituted for the respective spring elements 16 and 17.

A pan 6 is suspended by the hook 12, the hook considerably damping swinging movements of the pan 6 by virtue of its friction, and suspended by a rod 18 on the load carrier 2, aligned vertically with the spring element 16, so that no torque is exerted on the load carrier 2. The rod 18 carries a set of removable weights 4 on a holder 5. This holder 5 with weights 4 is referred to as the weight changer. A shock absorber 11 is provided between the weight changer 4, 5 and the load carrier 2. An additional shock absorber, not shown, can be provided between the pan 6 and the weight changer 4, 5.

Figure 2:
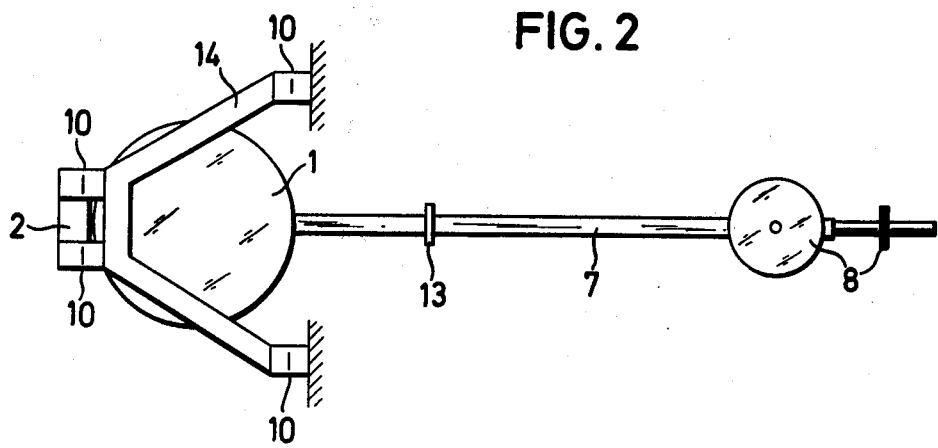
FIG. 2 is a top view of the balance shown in FIG. 1.

The load carrier 2 is connected, on its underside, by two horizontal rods (flexure elements) 15 with articulations 10 and, on its upper side, by two horizontal rods (flexure elements) 14 with articulations 10 to the housing 20. As can be seen in FIG. 2, the two rods 14 are provided on the upper side of load carrier 2, these rods forming the sloping sides of an isosceles trapezoid. The two rods 15 are similarly mounted on the underside of the carrier. The rods 14 and 15, arranged in this fashion, together with their respective articulations 10, constitute a parallel guidance system for the load carrier 2; this parallel guidance system accepting essentially only horizontal forces. As a result of its construction, the guidance system can handle torques and lateral forces from the pan 6. A pot magnet 1, integral with the housing 20, and located inside the parallel guidance system, is arranged relative to load carrier 2; a coil 23 is mounted in the slot 22 of the magnet 1, this coil being supported by a coil support 3. The support 3 rests upon a cross arm 21 of the load carrier 2. In this embodiment, the coil support 3 projects upward from the cross arm 21, whereby its midpoint is essentially aligned with the spring element 16 which transmits vertical forces to the beam 7. The horizontal distance between the articulations 13 and 9 of the spring (vertical flexure) elements 17 and 16 corresponds to the horizontal distance between the articulations 10 of the rods 14 and 15, so that the same curving movement is produced in the load carrier 2 by the parallel guidance and the beam 7.

Figure 3:
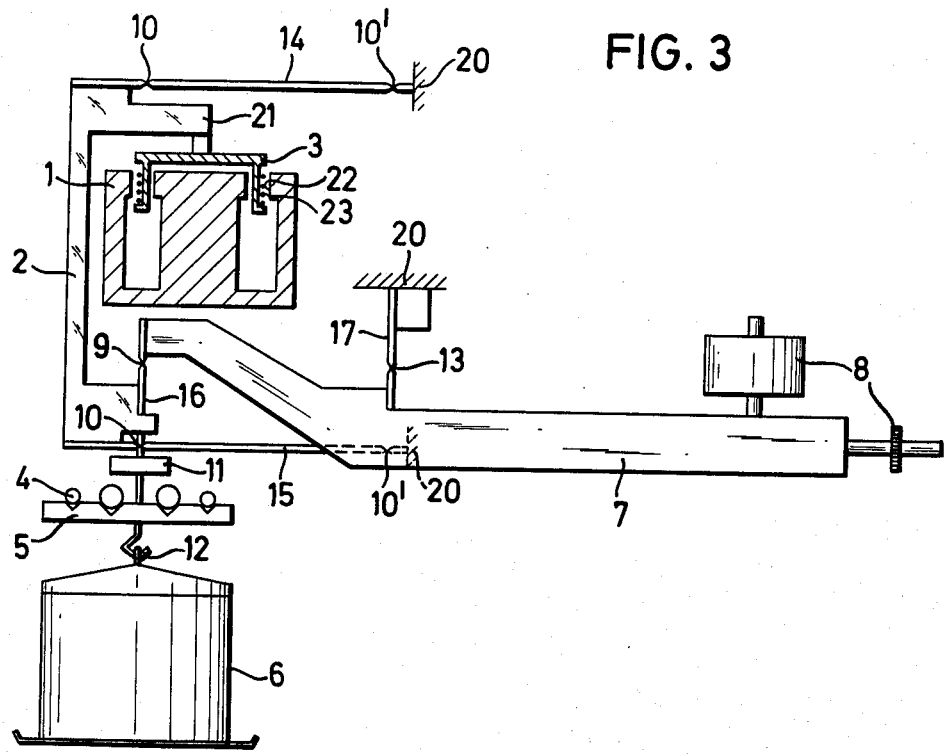
FIG. 3 is a somewhat diagrammatic illustration of a second embodiment of a balance according to the present invention in a side, partially sectional view.
Figure 4:
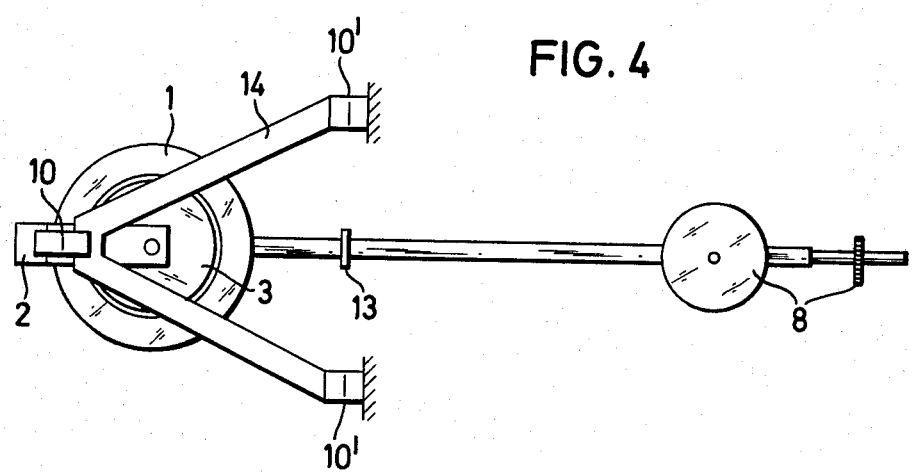
FIG. 4 is a top view of the balance shown in FIG. 3.

The second embodiment shown in FIGS. 3 and 4 includes essentially of the same elements as the embodiment shown in FIGS. 1 and 2. However, in this second embodiment the articulations of the rods 14 and 15 on the housing side, shown as 10', are mounted so that they are aligned vertically with the articulation 13 of the spring element 17 of the beam suspension. In this arrangement, there is no alignment between the midpoint of the coil support 3 and the spring element 16 which accepts the vertical forces. The coil support 3 projects downward from the cross arm 21 of the load carrier 2 into the slot 22 of the magnet 1. The rods 14 and 15 of the parallel guidance system in this second embodiment constitute the legs of an equilateral triangle, so that only a single articulation 10 is required at the apex of this triangle. In this manner, the number of articulations is reduced and a shorter structural length is produced.

Figure 5:
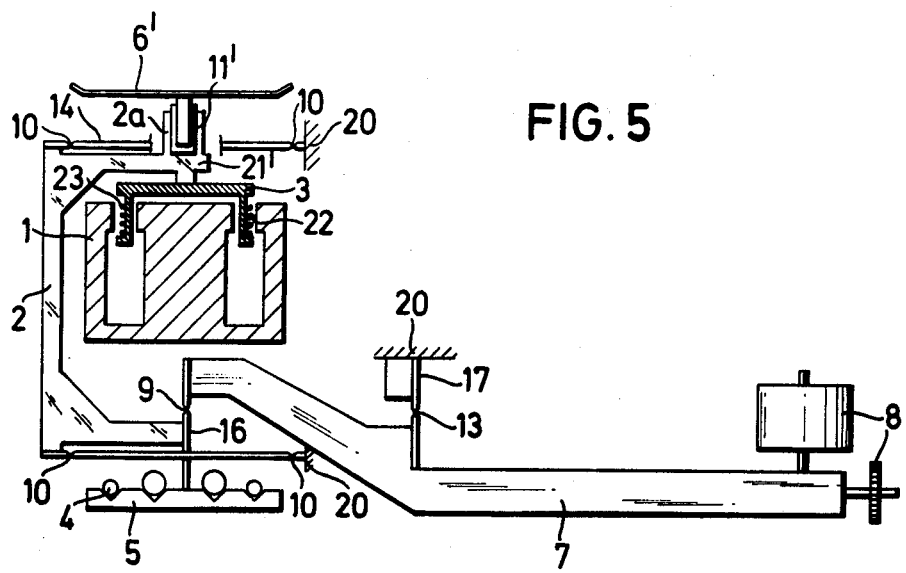
FIG. 5 is a somewhat diagrammatic illustration of a third embodiment of a balance according to the present invention in a side, partially sectional view.
Figure 6:
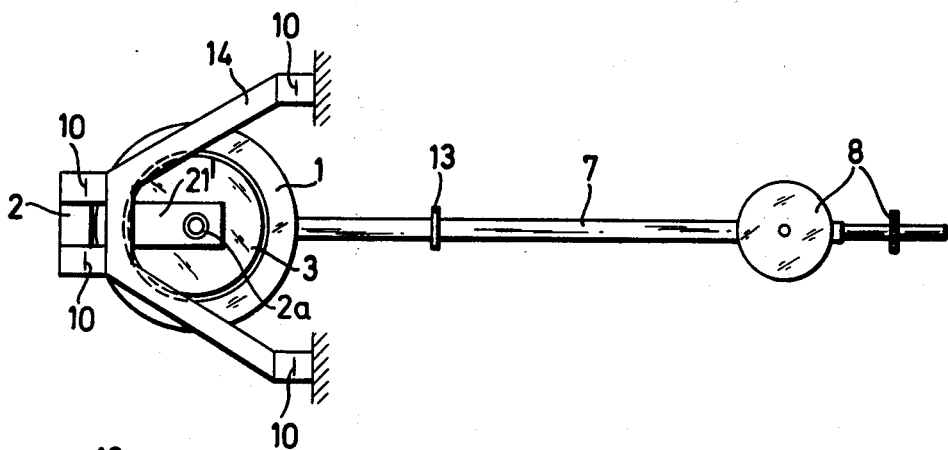
FIG. 6 shows a top view of the balance shown in FIG. 5, omitting the pan.

The third embodiment of the balance, shown in FIGS. 5 and 6, is designed to be a top-loading balance. In contrast to the embodiment shown in FIGS. 1 and 2, the third embodiment lacks the rods 18, the shock absorber 11, the pan hook 12, the below-balance pan 6 and the cross arm 21 on the load carrier 2, while the pot magnet 1 is mounted upside down so that its slot 22 is upward. The coil support 3 with the coil 23 is mounted in the slot 22. The coil support 3 is mounted centrally on a cross arm 21' of the load carrier 2, the load carrier 2 supporting a top-loading pan 6' in a pan holder 2a by a damping element 11'.

The balances shown in FIGS. 1–6 operate as follows: the counterweight 8 maintains equilibrium relative to the sum of the forces produced by the set of the weights 4, the load on the pan 6 or 6' and the electromagnetic force on coil support 3. For example, if the coil force is 0 to 10 g and the set of weights consists of 100 or 200 g in 10 g units, at the 0 point, in other words in the zero-load state, all of the weights 4 are applied, whereby equilibrium is produced without electromagnetic force. When a load is imposed, coarse compensation is achieved by removing the weights 4 from the support 5 while fine compensation is accomplished by means of the electromagnetic force. For this purpose, a known electrical circuit is used which controls the current to the coil 22 through a position indicator and a control circuit. In this manner, the weight of the load on the pan 6 or 6' can be determined very accurately.

Stops not shown in the figures are mounted relative to the load carrier 2 in such manner that its vertical travel is limited to less than 1 mm. These stops are advantageously mounted above and below the load carrier 2 and, in the first and second embodiments, aligned with the hook 12.

Figure 7:
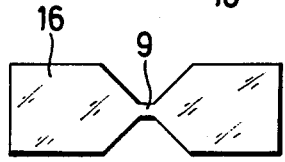
FIG. 7 shows an embodiment of a spring element in a top view.
Figure 8:
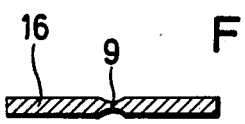
FIG. 8 shows another embodiment of a spring element in cross section.

FIGS. 7 and 8 show respectively sample embodiments of the spring elements 16 as examples. The other spring elements and articulations, however, can be designed in the same manner. The spring element 16, in each case, consists of a narrow strip of sheet metal which forms an articulation at a point 9 where its cross section is considerably reduced, by making it either less wide (FIG. 7) or less thick (FIG. 8) near its midpoint.

The illustrative embodiments described hereinabove have been set out not by way of limitation but by way of example. It is to be understood that other embodiments and variants are possible within the spirit and scope of the invention, its scope being defined by the appended claims.

What is claimed is:

1. In an electromagnetically compensating beam balance having a balance housing, a beam, fixed counterweight means on the beam, electromagnetic force compensation means for fine compensation and a weight changing means on its load-receiving side for coarse compensation, the improvement comprising at least two rods connected to said housing; a load carrier connected on one side of said beam with said rods and forming a parallel guidance system therewith, said rods accepting substantially only primarily horizontal forces and being coupled to said balance housing, and vertical flexure elements connected to said housing and which accept primarily vertical forces and are coupled to said beam.

2. An improved balance according to claim 1, wherein said vertical damping elements comprise strips of sheet metal with constrictions therein which form articulations.

3. An improved balance according to claim 1, wherein said rods comprise strips of sheet metal with restrictions therein which form articulations.

4. An improved balance according to claim 1, wherein said vertical flexure elements are taut bands.

5. An improved balance according to claim 1, wherein said rods in the parallel guidance system constitute sides of an isosceles trapezoid.

6. An improved balance according to claim 1, wherein said rods of the parallel guidance system form legs of an equilateral triangle.

7. An improved balance according to claim 1, wherein the distance between articulations of said rods of the parallel guidance system corresponds to the horizontal distance between a beam pivot point and at least one of said damping elements connecting said load carrier and said beam and including articulations located on a given same side of the parallel guidance system and fixed in one position.

8. An improved balance according to claim 1, wherein one of said damping elements which connects said load carrier and said beam is mounted in vertical alignment with a connection of a pan.

9. An improved balance according to claim 1, wherein one of said damping elements which connects said beam is mounted in vertical alignment with a connection of said weight changing means.

10. An improved balance according to claim 1, including a supporting coil for electromagnetic force compensation mounted on said load carrier.

11. An improved balance according to claim 1, including shock-absorbing means and friction joint means provided between a pan and said load carrier.

12. An improved balance according to claim 1, including stops for said load carrier, said stops permitting only slight vertical deflection.

13. An improved balance according to claim 1, wherein the height of said counterweight means is set so that said beam is indifferent to tilting of said balance housing.

14. An electromagnetically compensating beam balance, comprising:
- a housing;
- a beam having a load receiving end and another end, said beam being suspended from said housing with a first articulated flexure element therebetween;
- means to counterweight said beam near the other end thereof;
- weight changing means suspended from the load receiving end of said beam for coarse compensation, with a second articulated flexure element therebetween;
- load carrying means at the load receiving end of said beam; and
- electromagnetic force compensation means for fine compensation located near an end of said beam, and connected thereto with parallel guidance means to accept primarily only horizontal forces, said means comprising a plurality of rods connected to said housing by third articulated flexure elements, said rods being connected by a fourth articulated flexure element to supporting means for said electro-magnetic force compensation means, the horizontal distance between the articulations of first and second flexure elements and between the articulations of said third and fourth flexure elements being equal.

* * * * *